(12) United States Patent
Kashino et al.

(10) Patent No.: US 7,653,241 B2
(45) Date of Patent: Jan. 26, 2010

(54) SIGNAL DETECTION METHOD, SIGNAL DETECTION SYSTEM, SIGNAL DETECTION PROCESSING PROGRAM, AND RECORDING MEDIUM RECORDED WITH PROGRAM THEREOF

(75) Inventors: Kunio Kashino, Tokyo (JP); Akisato Kimura, Yamato (JP); Takayuki Kurozumi, Zama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 631 days.

(21) Appl. No.: 10/588,182

(22) PCT Filed: Jul. 13, 2005

(86) PCT No.: PCT/JP2005/012921

§ 371 (c)(1),
(2), (4) Date: Aug. 2, 2006

(87) PCT Pub. No.: WO2006/009035

PCT Pub. Date: Jan. 26, 2006

(65) Prior Publication Data

US 2007/0112728 A1 May 17, 2007

(30) Foreign Application Priority Data

Jul. 15, 2004 (JP) .............................. 2004-209088

(51) Int. Cl.
*G06K 9/00* (2006.01)
(52) U.S. Cl. ...................................... 382/170; 382/305
(58) Field of Classification Search .................. 382/168, 382/170, 305

See application file for complete search history.

(56) References Cited

U.S. PATENT DOCUMENTS 6,865,295 B2 * 3/2005 Trajkovic ..................... 382/170

(Continued)

FOREIGN PATENT DOCUMENTS

EP  1 286 278 A2  2/2003

(Continued)

OTHER PUBLICATIONS

Shogo Kimura et al., "Global na Edakari o Donyu shita Oto ya Eizo no Kosoku Kensaku" ("A Quick Search Method for Multimedia Signals Using Global Pruning"), The Transactions of the Institute of Electronics, Information and Communication Engineers, Oct. 1, 2002, vol. J85-D-II, No. 10, pp. 1552 to 1562.

(Continued)

*Primary Examiner*—Phuoc Tran
(74) *Attorney, Agent, or Firm*—Harness, Dickey & Pierce, P.L.C.

(57) ABSTRACT

A signal detection system of the invention comprises: a target signal feature quantity calculation section which derives a feature quantity series from a target signal; a stored signal feature quantity calculation section which derives a feature quantity series from a stored signal; a target signal histogram calculation section which searches for a histogram of feature quantities in a target signal feature quantity series; a stored signal histogram series calculation section which obtains a histogram series in regard to a stored signal feature quantity series, by calculating a histogram of feature quantities; a stored signal histogram grouping section which groups histogram series, for which a similarity level satisfies a criteria; a stored signal histogram group selection section which selects groups which include an area to be output from a histogram group; a stored signal collation section which performs collation with respect to histograms of a histogram group, and obtains a similarity value; and a collation result output section which outputs the area collated by the similarity value, as a detection result.

9 Claims, 4 Drawing Sheets

U.S. PATENT DOCUMENTS

| | | |
|---|---|---|
| 7,039,255 B2 * | 5/2006 | Lee et al. .................. 382/305 |
| 2003/0058268 A1 | 3/2003 | Loui et al. |
| 2004/0167785 A1 | 8/2004 | Kimura et al. |

FOREIGN PATENT DOCUMENTS

| | | |
|---|---|---|
| EP | 1426899 A2 | 6/2004 |
| JP | 2000-312343 | 11/2000 |
| JP | 2003-069924 A | 3/2003 |
| JP | 2004-199047 A | 7/2004 |
| JP | 3574075 B2 | 7/2004 |

OTHER PUBLICATIONS

Shogo Kimura et al., "Global na Edakari o Donyu shita Chojikan Onkyo shingo no Tansaku—Jikeiretsu Active Tansaku no Kosokuka—" ("Quick Searching of Long Audio Signals Using Global Pruning—Accelerating Time-Series Active Search—"), The Institute of Electronics, Information and Communication Engineers Gijutsu Kenkyu Hokoku, Feb. 16, 2001, vol. 100, No. 634, pp. 53 to 60 (with English abstract).

Shogo Kimura et al., "SPIRE: Sparse na Indexing ni yoru Gazochu no doitsu Bubun Ryoiki no Kenshutsu" ("SPIRE: A Partial Image Identification Method Based on Sparse Indexing"), The Transactions of the Institute of Electronics, Information and Communication Engineers, Aug. 1, 2005, vol. J88-D-II, No. 8, pp. 1712 to 1719.

Kunio Kashiwano et al., "Histogram Tokucho o Mochiita Onkyo Shingo no Kosoku Tansakuho—Jikeiretsu Active Tansakuho-" ("A Quick Search Algorithm for Acoustic Signals Using Histogram Features—Time-Series Active Search-"), The Transactions of the Institute of Electronics, Information and Communication Engineers, Sep. 1, 1999, vol. J82-D-II, No. 9, pp. 1365 to 1373.

Kunio Kashiwano et al., "Histogram Tokucho o Mochiita Oto ya Eizo no Kosoku and/or Tansaku" ("Quick and/or Search for Multimedia Signals Based on Histogram Features"), The Transactions of the Institute of Electronics, Information and Communication Engineers, Dec. 1, 2000, vol. J83-D-II, vol. No. 12, pp. 2735 to 2744.

Miyamoto, Sadaaki, "Fuzzy Clustering and its Application," Journal of Japan Society of Fuzzy Theory and Systems, Jun. 15, 1996, pp. 423-430, vol. 8, No. 3, Japan Society of Fuzzy Theory and Systems, Japan.

* cited by examiner

FIG. 5

| METHOD | REQUIRED AVERAGE CPU TIME | REQUIRED NUMBER OF COLLATIONS |
| --- | --- | --- |
| PRIOR ART (TAS) | 205ms | 92785 |
| (1)+TSA | 45ms | 102683 |
| EMBODIMENT 1 OF PRESENT INVENTION (1)+(2) | 42ms | 102639 |
| EMBODIMENT 2 OF PRESENT INVENTION ((1)+(2)+(3)) | 15ms | 66458 |

(1) HISTOGRAM THINNING
(2) LOCAL GROUPING
(3) GLOBAL GROUPING

SIGNAL DETECTION METHOD, SIGNAL DETECTION SYSTEM, SIGNAL DETECTION PROCESSING PROGRAM, AND RECORDING MEDIUM RECORDED WITH PROGRAM THEREOF

TECHNICAL FIELD

The present invention relates to a signal detection method which detects by searching for a predetermined signal from within a stored signal series, or a signal similar to a part thereof, and is, for example, applicable to sound signal detection.

Priority is claimed on Japanese Patent Application No. 2004-209088 filed Jul. 15, 2004, the content of which is incorporated herein by reference.

BACKGROUND ART

Conventionally, in regard to signal detection methods, signal searching methods, which have an object of detecting areas within a stored signal which is similar to the target signal, are known (for example, refer to "High-speed Signal Searching Method, Apparatus, and Recording Medium Thereof" of Patent Document 1).

However, in the method of this Patent Document 1, since only local pruning (pruning refers to the exclusion of candidates as areas which should be collated without performing collation) was used, in a case where a large stored signal was made the target, there was a shortcoming in that a long time was required for the search.

Furthermore, in regard to other signal detection methods, a signal searching method resulting from global pruning using a L2 distance, which is the Euclidean distance, for measuring the similarity between feature vectors is known (for example, refer to "Signal Detection Method, Signal Detection Apparatus, Recording Medium, and Program" of Patent Document 2).

Here, the L2 distance $d_2$ is normally defined by the formula (1) shown below, and the like. In formula (1), if the feature vectors are represented by X and Y, then $X=(x_1, \ldots, X_N)$, and $Y=(y_1, \ldots, Y_N)$.

$$d_2(X, Y) = \sqrt{\sum_{i=1}^{N} (x_i - y_i)^2} \quad (1)$$

However, in the method of this Patent Document 2, because the method of using the L1 distance measure in global pruning was not clear, there was a shortfall in that a search based solely on the L1 distance, which is often highly accurate compared to the L2 distance, could not be performed.

Here, the L1 distance $d_1$ used in the present invention is a distance based on the linear difference between $x_i$ and $y_i$ in the abovementioned feature vectors, and is defined by the formula (2) below.

$$d_1(X, Y) = \sum_{i=1}^{N} |x_i - y_i| \quad (2)$$

[Patent Document 1] Japanese Unexamined Patent Application, First Publication No. 2000-312343.
[Patent Document 2] Japanese Patent No. 3574075.

DISCLOSURE OF INVENTION

[Problems to be Solved by the Invention]

The present invention takes such circumstances into consideration, and has been carried out in order to solve the shortfalls of conventional technologies, with an object of providing a processing method of signal detection ensuring a search accuracy equivalent to the method disclosed in Patent Document 1 of the conventional technologies mentioned above, which is faster compared to these conventional technologies.

[Means for Solving the Problem]

In order to achieve the abovementioned object, the signal detection system of the present invention is a system which detects signals similar to a target signal from stored signals which are stored, comprises: a target signal feature quantity calculation section which derives a feature quantity series from a target signal; a stored signal feature quantity calculation section which derives a feature quantity series from a stored signal; a target signal histogram calculation section which sets a predetermined observation window in a feature quantity series derived in the target signal feature quantity calculation section, and calculates a histogram of the feature quantities within the observation window; a stored signal histogram series calculation section which obtains a histogram series in regard to a feature quantity series derived in the stored signal feature quantity calculation section, by sequentially setting a predetermined observation window with respect to each section of a size which corresponds to the observation window, and calculating a histogram of feature quantities within the observation window; a stored signal histogram grouping section which groups histogram series sets in a histogram series obtained from the stored signal histogram series calculation section, for which a mutual similarity level calculated with a predetermined L1 distance measure satisfies a predetermined criteria; a stored signal histogram group selection section which determines the existence of a possibility of the inclusion of an area which should be output from within a histogram group obtained in the stored signal histogram grouping section, and selects the group which has a possibility; a stored signal collation section which performs collation with respect to histograms belonging to a histogram group selected in the stored signal histogram group selection section, by the predetermined L1 distance measure, and obtains a similarity value; and a collation result output section which determines whether or not the collated area is to be made a detection result, by the similarity value obtained in the stored signal collation section, and outputs the collated area in a case where it has been determined it is to be made a detection result.

As a result of this configuration, the present invention is able to shorten the time (search time) from when the target signal is supplied to when the search result is obtained, compared to Patent Document 1, while ensuring the same searching accuracy as the method of Patent Document 1.

Furthermore, the present invention, in regard to the distance measure in the global pruning operation, is able to ensure the same search accuracy as the method of Patent Document 1, by not using the L2 standard of Patent Document 2, and newly employing a standard using the L1 distance.

Furthermore, in regard to the stored signal histogram grouping section in the present invention, the threshold value of the L1 distance, which is set beforehand, may be used as the threshold at the time of grouping. As a result, an accuracy which is the same as all searches based on the L1 distance can be ensured.

In the present invention, a stored signal histogram thinning section can be further installed. As a result, a faster search can be achieved without impairing the accuracy.

[Effects of the Invention]

As explained above, according to the present invention, by performing global grouping and local grouping based on the L1 distance, and efficiently narrowing the search space, there is an advantage in that compared to the methods of the prior art previously referred to (Patent Document 1 and Patent Document 2), an effective partial signal detection can be quickly performed, while maintaining the search accuracy.

BRIEF DESCRIPTION OF THE DRAWINGS

FIG. 5 is a table comparing the detection results resulting from processing of the signal detection method according to the first, second, and third embodiments of the present invention with the detection results of systems of conventional examples.

BEST MODE FOR CARRYING OUT THE INVENTION

First Embodiment

Next, an embodiment of the present invention is explained with reference to the drawings.

Figure 1:
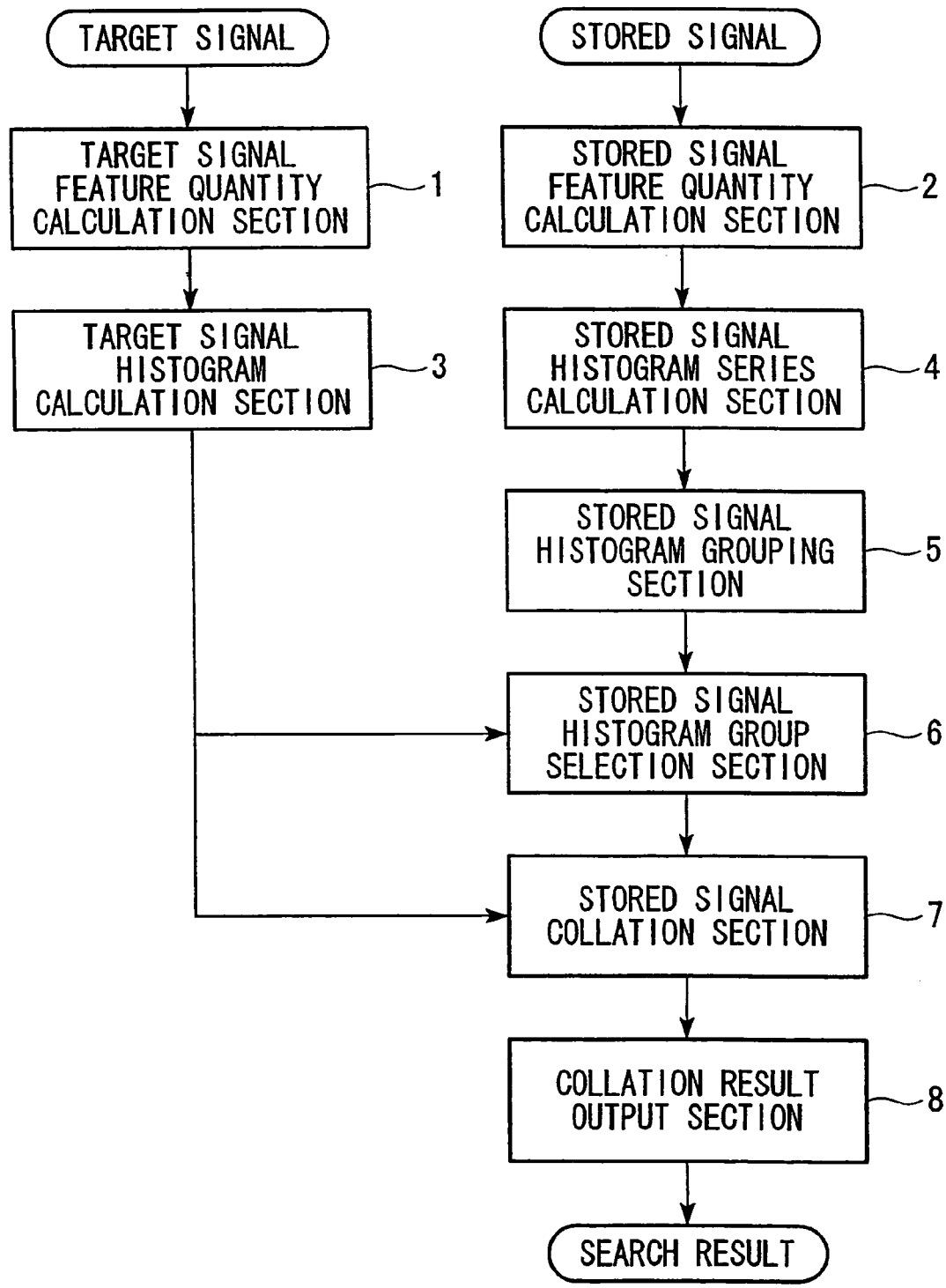
FIG. 1 is a block diagram showing a configuration example of a signal detection system according to a first (and second) embodiment of the present invention.

FIG. 1 is a block diagram showing a first embodiment of a signal detection system with the method of the present invention applied.

Although apparatuses subject to video signals are principally explained below, searching of sound signals can be performed by performing feature extraction from sound signals, which represent the target signals and the stored signals, in the target signal feature quantity calculation section 1 and the stored signal feature quantity calculation section 2 in the same configuration as mentioned below.

The signal detection system of the present first embodiment is configured by the target signal feature quantity calculation section 1, the stored signal feature quantity calculation section 2, a target signal histogram calculation section 3, a stored signal histogram series calculation section 4, a stored signal histogram grouping section 5, a stored signal histogram group selection section 6, a stored signal collation section 7, and a collation result output section 8.

That is to say, as a result of the configuration mentioned above, the signal detection system of the present invention inputs the target signal, that is to say, a signal containing a signal to be searched for as a part thereof, which represents a sample, and the stored signal, that is to say, the signal that is searched, and outputs the areas in the stored signal in which the similarity level between a given region of the target signal exceeds a previously set value (this is referred to as the search threshold) θ.

The target signal feature quantity calculation section 1 derives a feature quantity series from the target signal that is input.

Then, the stored signal feature quantity calculation section 2 derives a feature quantity series from the stored signal that is input.

Next, the target signal histogram calculation section 3 sets an observation window of a certain length in the feature quantity series derived by the target signal feature quantity calculation section 1, and calculates a histogram of feature quantities within the observation window.

Furthermore the stored signal histogram series calculation section 4, sequentially sets the size corresponding to this observation window in the feature quantity series derived by the stored signal feature quantity calculation section 2, and obtains a histogram series by calculating a histogram of feature quantities within the observation window.

Then, the stored signal histogram grouping section 5 performs grouping of the histogram series obtained by the stored signal histogram series calculation section 4 by integrating the histograms in which the mutual similarity levels (for example, the similarity value explained hereafter) calculated by a predetermined L1 distance measure, satisfy a predetermined criteria.

Next, the stored signal histogram group selection section 6 determines the presence of a possibility of the inclusion of areas which should be output from within the histogram groups obtained by the stored signal histogram grouping section 5, and selects the histogram groups in which there is a possibility.

The stored signal collation section 7 obtains the similarity value by performing collation with respect to the histograms which belong to the histogram group selected in the stored signal histogram group selection process according to the predetermined distance measure mentioned above.

A collation result output device 8, based on a similarity value obtained in the stored signal collation process, determines whether or not the collated area should be output as a detection result, and in a case where it should be output, this is output.

Next, the operation of the signal detection system according to the first embodiment is explained with reference to FIG. 1.

The target signal feature quantity calculation section 1 reads the supplied predetermined target signal.

Then, the target signal feature quantity calculation section 1 performs feature extraction with respect to the read target signal.

In this first embodiment, as a feature to be extracted, a video image feature of a video image input as the target signal is used.

As this video image feature, although a wide variety can be applied including those based on discrete cosine transformation, in this first embodiment, color features shall be used.

That is to say, the image of one frame of the video image is horizontally divided into four parts, and vertically divided into three parts for a total of 12 parts, and the RGB value within each division is made the feature, such that in total it is made a 36-dimensional feature vector.

If p represents the frame number, and W represents the number of divisions (12 in this case), the video image feature x(p) is expressed by the formula (3) below.

$$x(p)=(x_{1r}(p), x_{1g}(p), x_{1b}(p), \ldots x_{jc}(p), \ldots x_{wr}(p), x_{wg}(p), x_{wb}(p)) \quad (3)$$

In the formula (3), c represents any of r (red), g (green), or b (blue), and j represents any integer from 1 to the number of divisions W. Furthermore, $X_{jc}$ represents a normalized RGB value, and is defined by the formula (4) below.

$$x_{jc}(p) = \frac{\bar{y}_{jc}(p) - \min_i \bar{y}_{ic}(p)}{\max_i \bar{y}_{ic}(p) - \min_i \bar{y}_{ic}(p)} \quad (4)$$

$$\bar{y}_{ic}(p) = \frac{1}{|I_i(p)|} \sum_{q \in I_i(p)} y_{qc}(p)$$

In this formula (4), I i(p) is the set of pixels contained in the ith divided image, and i represents any integer from 1 to the number of divisions W. Furthermore, |·| represents the number of elements in a set, |I i(p)| represents the number of pixels contained in the ith divided image, and $Y_{qc}(p)$ represents the color value of the color c in the pixel q.

Next, the stored signal feature quantity calculation section 2 firstly reads the stored signal.

Then, the stored signal feature quantity calculation section 2 performs feature extraction with respect to the read stored signal. Feature extraction in this stored signal feature quantity calculation section 2 is performed by the same process as the previously explained feature extraction of the target signal feature quantity calculation section 1.

Next, the target signal histogram calculation section 3 reads the series of feature vectors output by the target signal feature quantity calculation section 1.

Then, the target signal histogram calculation section 3 sets observation windows with respect to the series of feature vectors which have been input.

In this first embodiment, the length of the observation windows is represented by D.

Next, the target signal histogram calculation section 3 creates a histogram of the feature vectors from the feature vectors within the observation window.

That is to say, when the feature vectors, which are subject to quantization, are input (Step 1), the target signal histogram calculation section 3, searches for the representative vector it is closest to by referring to a previously created code book (Step 2), and outputs the retrieved closest representative vector as the result of quantization of the input feature vector (Step 3).

The creation of the code book is possible by preparing learning vectors (Step 1), categorizing the learning vectors by a known clustering algorithm, for example, the LBG (Linde-Buzo-Gray) algorithm (Step 2), making the median point in each category a representative vector, and making the set of representative vectors the codebook.

Figure 2:
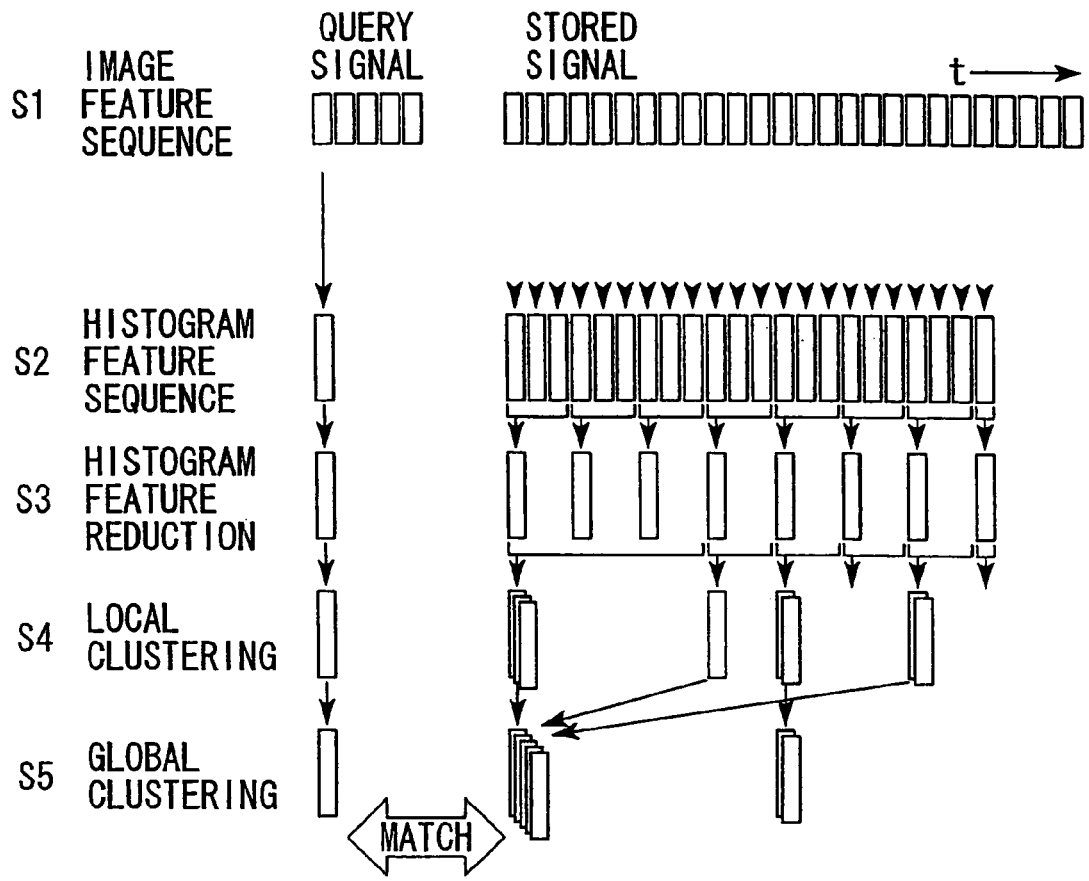
FIG. 2 is a conceptual diagram showing the process flow of the signal detection method according to the first, second, and a third embodiments of the present invention.

Then, the target signal histogram calculation section 3, as shown in S2 of FIG. 2, creates the histogram of feature vectors with respect to the feature vectors which have been categorized by the process mentioned above, by counting the number of feature vectors within each category.

Here, the histogram obtained in regard to the target signal in the target signal histogram calculation section 3 is represented by $H^{(R)}$.

A proviso is that R is a superscript representing that the histogram is one that has been created from the feature vectors of the target signal.

Next, the stored signal histogram series calculation section 4 firstly reads the series of feature vectors output from the stored signal feature quantity calculation section 2.

Then, the stored signal histogram series calculation section 4 sets the observation window with respect to the feature vectors, which are read into a time series, in the same manner as the target signal histogram calculation section 3. The length of this observation window is made the same length as the observation window set by the target signal histogram calculation section 3 with respect to the target signal (that is to say, D).

Then, the stored signal histogram series calculation section 4 obtains the series of histograms in S2 of FIG. 2 by creating a sequential histogram while moving the observation windows one by one for every feature vector starting from the head of the series in the series of feature vectors of the stored signal.

Here, the stored signal histogram series calculation section 4 performs the creation process of the histograms by the same process as the generation of the histograms in the target signal histogram calculation section 3.

That is to say, the stored signal histogram series calculation section 4 categorizes the feature vectors, which are sequentially input, by the same method of quantization as the target signal histogram calculation section 3, and creates the histogram of feature vectors by counting the number of feature vectors within each category.

Next, the stored signal histogram grouping section 5 reads in the stored signal histogram series output from the stored signal histogram series calculation section 4.

Then, the stored signal histogram grouping section 5, in regard to each part of the stored signal histogram series determined by a predetermined distance measure (L1 measure), collates those areas in which the mutual similarity value is above a constant, as a group.

This can be achieved by performing at least one of two types from local grouping (the first embodiment, which is the present embodiment) and global grouping (the second embodiment explained hereafter) explained below. Firstly, local grouping is explained. Local grouping, like the similarity in a video signal within the same shot, is one which focuses on local similarities, which is often observed in sound and video signals.

The stored signal histogram output from the stored signal histogram series calculation section 4 is represented by $H_i^{(S)}$ (i=1, ..., I), and the histogram groups in the local grouping is represented by $C_j^{(L)}$ (j=1, 2, ..., J).

The initial state is a state in which i=1, j=1, J=1, and $C_1^{(L)}$ possesses only one member $H_1^{(S)}$.

Grouping can be performed by the stored signal histogram grouping section 5 by the procedure shown below.

(A1) Increase i by one.

(A2) Calculate $S_{ij}^{(L)}$ by, for example, the formula (5) below. This represents the similarity level between $H_i^{(S)}$ and the feature $H_j^{(L)}$ of the representative histogram of $C_j^{(L)}$ (a small distance and a high similarity value are equivalent).

$$S_{ij}^{(L)} = S(H_i^{(S)}, H_j^{(L)}) = \frac{1}{D} \sum_{n=1}^{N} \min(h_{in}, h_{jn}^{(L)}) \quad (5)$$

The above formula (5) is, for example, one which obtains the distance between the histograms $H_i^{(S)}$ and $H_j^{(L)}$ according to the proportion of histogram overlap.

In this formula, the histogram series $H_i^{(S)}$ and $H_j^{(L)}$ are defined as in formula (6) shown below.

$$H_i^{(S)} = (h_{i1}^{(S)}, \ldots h_{in}^{(S)}, \ldots h_{iN}^{(S)})$$

$$H_j^{(L)} = (h_{j1}^{(L)}, \ldots h_{jn}^{(L)}, \ldots h_{jN}^{(L)}) \quad (6)$$

(A3) If $S_{ij}^{(L)} > \theta^{(L)}$, $H_i^{(S)}$ is added as an element of $C_j^{(L)}$. Here, the L of the threshold $\theta^{(L)}$ indicates that it is a threshold used in regard to local grouping. This threshold $\theta^{(L)}$ is one based on the lower limit of the L1 distance (the upper limit of the similarity level) in regard to local grouping.

On the other hand, if $S_{ij}^{(L)} \leq \theta^{(L)}$, a new stored signal histogram feature group is made, the histogram series $H_i^{(S)}$ is made the representative histogram feature thereof, and j and J are increased by one.

(A4) If $i \neq I$, return to the process of (A1) above.

In this procedure, the first element $H_{m(j)}^{(S)}$ of $C_j^{(L)}$ becomes the representative histogram $H_j^{(L)}$ of $C_j^{(L)}$. That is to say, the following formula (7) holds for all $H_i^{(S)}$ contained in each $C_j^{(L)}$.

$$S(H_i^{(s)}, H_{m(j)}^{(s)}) = S(H_i^{(s)}, H_j^{(L)}) =$$
$$S_{ij}^{(L)} > \theta^{(L)} \text{ ただし } _{m(j) = \min\{i | H_j^{(s)} \in C_j^{(L)}\}} \quad (7)$$

Then, the stored signal histogram group selection section 6 reads in the target signal histogram output from the target signal histogram calculation section 3.

Next, the stored signal histogram group selection section 6 reads in the stored signal histogram group output from the stored signal histogram grouping section 5, and selects only the histogram groups which need to be collated, by referring to the representative histogram features of each group, and the previously set similarity level thresholds.

That is to say, the stored signal histogram group selection section 6 selects from within the input histogram groups those histogram groups which exceed the previously set similarity threshold, determines that there is a possibility that an area that should be output is contained, and then outputs.

The stored signal collation section 7, with respect to only the stored signal histogram groups selected by the stored signal histogram group selection section 6, calculates the stored signal histogram features belonging to the group thereof, and the similarity value between the target signal histogram. In a case where the similarity level standard uses the L1 distance, the similarity level S is defined by the formula (8) shown below.

$$S(H^{(R)}, H^{(S)}) = \frac{1}{D} \sum_{n=1}^{N} \min(h_n^{(R)}, h_n^{(S)}) \quad (8)$$

Figure 3:
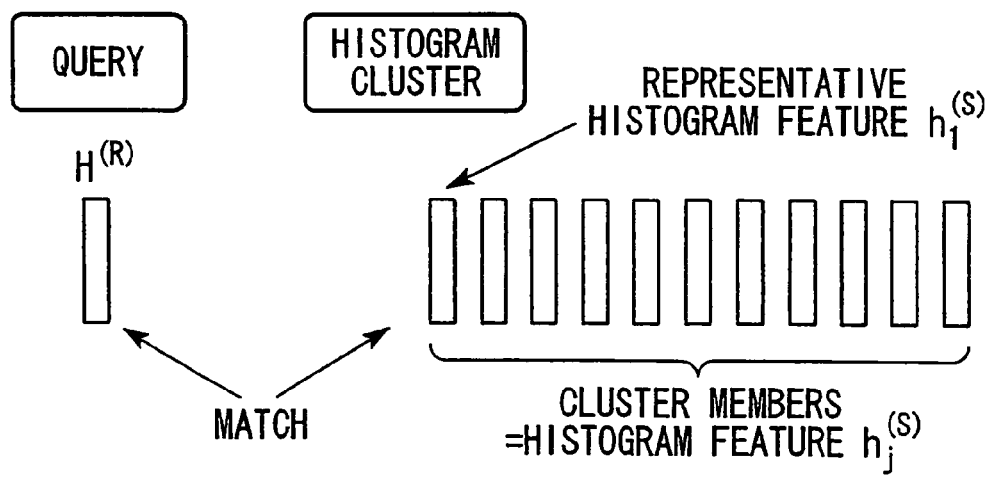
FIG. 3 is a conceptual diagram showing the process flow of the signal detection method according to the first, second, and third embodiments of the present invention.

In the formula (8) above, as shown in FIG. 3, $H^{(R)}$ and $H^{(S)}$ are the target signal histogram and the stored signal histogram respectively, and D is the length of the observation window.

Then, if the stored signal collation section 7 detects an area with a similarity level S larger than the set search threshold θ, it is determined that the target signal has been detected in the area of the stored signal.

Next, the collation result output section 8 inputs the information of the area output from the stored signal collation section 7 in which its threshold with the target signal is above the set threshold, and following preparation into an output format which complies with the object, it is output in practice as the search result.

As the output format which complies with the object mentioned above, for example, attached information, such as the date of recording of the video, the title assigned to the video, or the like, can be considered.

Furthermore, the attached information mentioned above, which has previously been associated with the stored signal, is stored in the storage section, and the like, inside the collation result output section 8.

Second Embodiment

Next, a second embodiment is explained with reference to FIG. 1. The second embodiment is the same as the first embodiment in terms of the configuration. The point in which the second embodiment differs from the first embodiment is the point that following the stored signal histogram grouping section 5 performing local grouping represented by S4 in FIG. 2, these local groups are further grouped, and global grouping is performed.

Hereunder, the global grouping performed in the stored signal histogram grouping section 5 is explained.

In global grouping, groups are made such that the similarity level between all elements within the group with the representative histogram features of the group thereof become greater than the threshold $\theta^{(G)}$. Here, the G of $\theta^{(G)}$ represents that it is a threshold used with respect to global grouping. This threshold $\theta^{(G)}$ is one based on the lower limit (the upper limit of the similarity level) of the L1 distance in regard to global grouping.

In such a group $C_k^{(G)}$, for example, grouping can be performed by the stored signal histogram grouping section 5 in a procedure as follows.

The local groups created in the local grouping mentioned above are represented by $C_j^{(L)}$ (j=1, ..., J). Furthermore, the initial state of the global grouping is made to be j=1, J=(the number of local groups created in the local grouping), the index of the global group k=0, and the number of global groups K=0.

(B1) j is increased until an element of $C_j^{(L)}$ which does not appear to belong to any global group is found.

Then, if such a $C_j^{(L)}$ exists, k is increased by one, and a new global group $C_k^{(G)}$ is created, and K is increased.

As a result, all the elements of $C_j^{(L)}$ are added to the elements of $C_k^{(G)}$.

(B2) The representative histogram features $H_k^{(G)}$ of $C_k^{(G)}$, and the distance $S_{pk}^{(G)} = S(H_p^{(L)}, H_k^{(G)})$ between the representative histogram features $H_p^{(L)}$ of $C_k^{(G)}$ (p=j+1, ... J) is calculated. $C_p^{(L)}$ satisfies the formula (9) below.

$$C_p^{(L)} \subset C_q^{(G)}, \forall q > k \quad (9)$$

(B3) If $S_{pk}^{(G)} > \theta^{(G)}$, then all the elements of $C_p^{(L)}$ are added to $C_k^{(G)}$.

(B4) If $j \neq J$, return to process (B1).

Then, the stored signal histogram grouping section 5 outputs the obtained stored histogram group to the stored signal histogram group selection section 6.

The process thereafter is the same as in the first embodiment.

Third Embodiment

Next, a third embodiment is explained with reference to FIG. 4.

Figure 4:
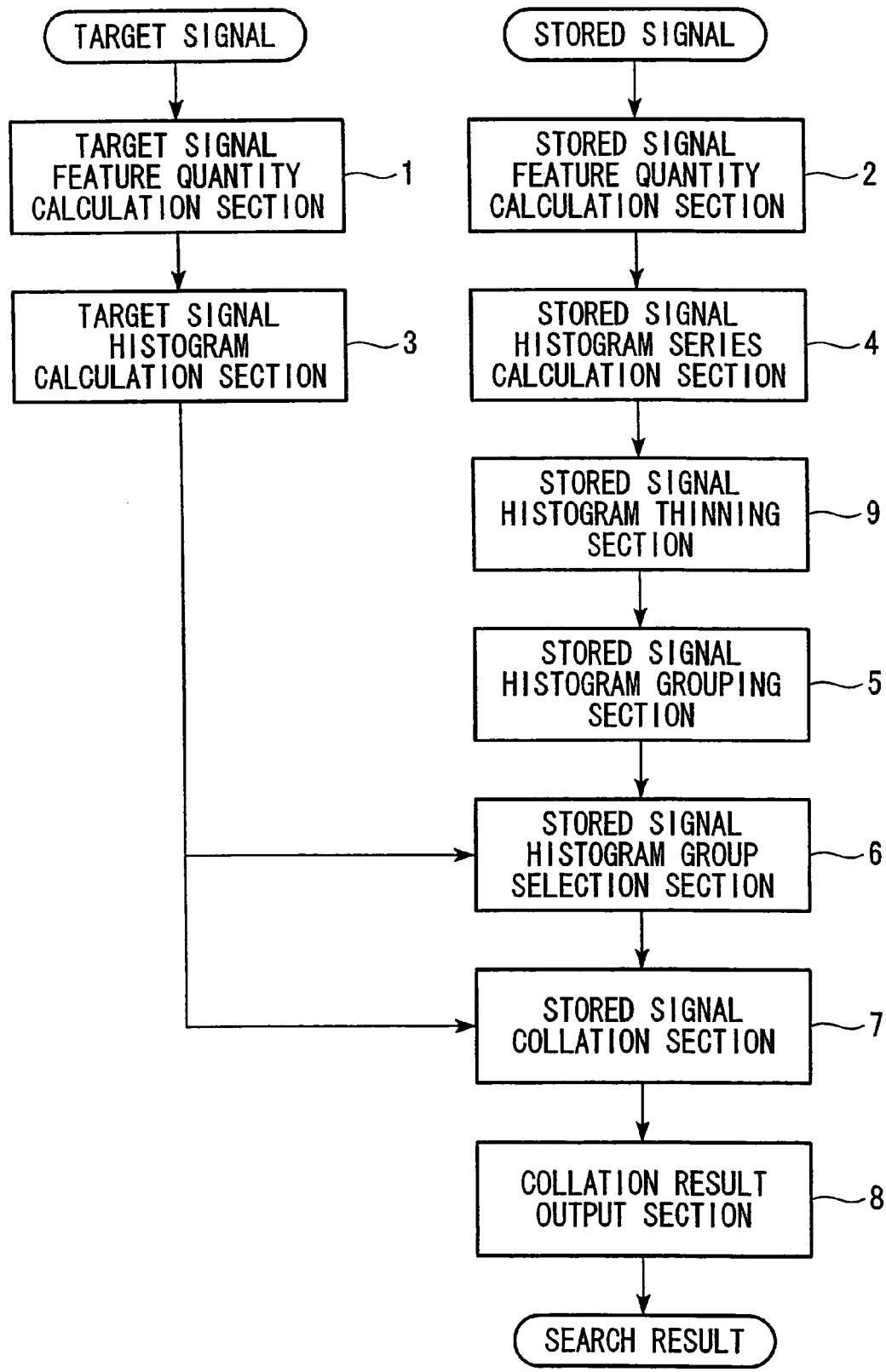
FIG. 4 is a block diagram showing a configuration example of the signal detection system according to the third embodiment of the present invention.

The third embodiment of the present invention shown in FIG. 4 is, in terms of the configuration, the same configuration as the first and second embodiments shown in FIG. 1. The point of difference is that a stored signal histogram thinning section 9 is further provided between the stored signal histogram series calculation section 4 and the stored signal histogram grouping section 5.

That is to say, as explained in the first and the second embodiments, not all feature vectors in S2 of FIG. 2 are used, and the histogram series is created while moving the feature vectors by a fixed number as shown in S3 of FIG. 2, that is to say, by performing thinning.

For example, if the thinning number is made to be M=50, the number of histograms used at the time of histogram grouping can be compacted from 50 to 1.

In this manner, as well as being able to reduce the recording device capacity needed for recording of the histogram series to 1/M, it has an effect in improving the speed of searching.

The stored signal histogram grouping section 5 reads in the stored signal histogram series output from the stored signal histogram thinning section 9.

Here, in the calculation in the stored signal histogram grouping section 5, a second search threshold θ" which is somewhat lower than the previously set search threshold θ is set by the formula (10) shown below.

$$\theta''=\theta'-(1\theta^{(L)}) \quad (10)$$

In the formula (10) above, θ' is defined by the formula (11) below.

$$\theta' = \theta - \frac{M}{D} \quad (11)$$

In the formula (11) above, M represents the thinning number.

If this second threshold is used, then with respect to the local group $C_j^{(L)}$, if in regard to the similarity level $S_{Rj}^{(L)}=S(H^{(R)}, H_j^{(L)})$ between the histogram $H^{(R)}$ of the target signal and the representative histogram $H_j^{(L)}$ of $C_j^{(L)}$, $S_{Rj}^{(L)} \leq \theta''$ holds, then the collation calculations of the remaining elements of $C_j^{(L)}$ can be omitted without loss of accuracy.

Then, the stored signal histogram grouping section 5 outputs the obtained stored histogram groups to the stored signal histogram group selection section 6.

Then, as in the second embodiment, at the time of performing global grouping, in a case where thinning of the histogram series is performed, the stored signal histogram grouping section 5 introduces a third threshold as shown below.

At this time, if a third search threshold $\theta^{(T)}$ defined by the formula (12) shown below is introduced, then with respect to the global group $C_k^{(G)}$, in regard to the similarity level $S_{Rk}^{(G)}=S(H^{(R)}, H_k^{(G)})$ between the histogram $H^{(R)}$ of the target signal and the representative histogram $H_k^{(G)}$ of $C_k^{(G)}$, if $S_{RK}^{(G)} \leq \theta^{(T)}$, then even if collation of the remaining elements of $C_k^{(G)}$ is skipped, it is ensured that search leakages are not generated.

$$\theta^{(T)}=\theta''-(1-\theta^{(G)}) \quad (12)$$

The other processes are the same as the processes of the first and the second embodiments.

As mentioned above, even in a case where the stored signal histogram thinning section 9 is provided, in regard to the search result, the same result as a case where stored signal histogram thinning is not performed is strictly ensured, and this point is the significant characteristic of the third embodiment in the present invention.

Then, in a case where histogram thinning is performed in the third embodiment of the present invention, although it is ensured that search leakages are not generated by way of the thinning, as it stands there is a possibility of extra output to be included.

Therefore, within the range of the thinning width before and after the detected area, collation is performed again in a state where the histograms are not thinned. As a result, an output without both the search leakages and the extra output can be obtained.

APPLICATION EXAMPLE OF THE PRESENT INVENTION

Next, an operation experiment example of the signal detection system according to the present invention is shown in FIG. 5.

In order to confirm the effects of the signal detection system of the present invention, a signal detection experiment was performed, with a video signal as the subject.

Here, the length of the stored signal, which is the video signal, was made to be 150 hours, and a video signal of the NTSC format was compressed by a frame rate of 29.97 frames/s and by the MPEG-2 compression format, and this was made the stored signal.

Furthermore, the picture size of the video signal was made to be 704×480 pixels.

Then, from within the stored signal, a 7.5 second video fragment was randomly selected. This was made the target signal, and was searched from the stored signal.

In the experiment, the thresholds used in the search of the target signal were made to be θ=0.8, $\theta^L$=0.9, $\theta^G$=0.6; M/D=0.1.

The table of FIG. 5 shows, in regard to 10 target signals, the average CPU time of the time required for their search processes.

In the table mentioned above, as a method, the one denoted "TAS" (time series active search method) denotes the signal detection method in "High-speed Signal Searching Method, Apparatus, and Recording Medium Thereof" of Patent Document 1.

In this manner, while being a method which can obtain the same result as "TAS", a search no less than 10 times faster is possible.

If histogram thinning is not introduced, although when the storage capacity of one histogram is made to be 512 bytes, the histogram storage capacity of the equivalent of 150 hours becomes 8 GB or more, making it difficult to achieve on a personal computer and the like, by setting M/D=0.1, it can be reduced to approximately 380 MB.

Furthermore, although it appears the effect of local grouping is small, the number of histogram features which must be considered in regard to global grouping was reduced from 808821 when local grouping was not performed, to 348546, and it was found that the amount of calculations necessary for global grouping was reduced.

The signal detection process may be performed by recording a program for achieving the function of the signal detection system in FIG. 1 on a computer-readable recording medium, reading the program recorded on this recording medium into a computer system, and executing the program. The "computer system" referred to here is made to be one containing an OS, and hardware such as peripheral devices. Furthermore, the "computer system" is made to be one containing a WWW system comprising a homepage providing environment (or a display environment). Moreover, the "computer-readable recording medium" refers to a portable medium such as a flexible disk, an optical magnetic disk, a ROM, or a CD-ROM, or a storage device such as a hard disk built into the computer system. Furthermore, the "computer-readable recording medium" is made to include those that retain the program for a fixed time, such as the volatile memory (RAM) of the interior of computer systems, which become the server and the clients in cases where the program is transmitted through a network, such as the internet, or a communication line, such as a telephone line.

Furthermore, the program may be transmitted from the computer system which stores this program in its storage device, or the like, through a transmission medium or by a transmitted wave within the transmission medium, to another computer system. Here, the "transmission medium", which transmits the program, refers to a medium which possesses a function of transmitting information in the manner of networks (communication networks), such as the internet, or communication circuits (communication lines), such as telephone circuits. Furthermore, the program may be one for achieving a portion of the functions mentioned above. Moreover, it may be a so-called differential file (differential program), which is one that can achieve the function mentioned above through a combination with a program already recorded in the computer system.

INDUSTRIAL APPLICABILITY

The present invention, for example, with an object in properly managing the use of music on the internet, based on a sound signal of previously registered subject music, can be used in technology for detecting sound signal files on the internet which contain a portion thereof.

Furthermore, the present invention is applicable not only for sound signals as mentioned above, but also the detection of video signals with an object in managing video information on the internet.

The invention claimed is:

1. A signal detection system which detects signals similar to a target signal from stored signals which are stored, comprising:
   a target signal feature quantity calculation section which derives a feature quantity series from a target signal;
   a stored signal feature quantity calculation section which derives a feature quantity series from a stored signal;
   a target signal histogram calculation section which sets a predetermined observation window in a feature quantity series derived in said target signal feature quantity calculation section, and calculates a histogram of the feature quantities within said observation window;
   a stored signal histogram series calculation section which obtains a histogram series in regard to a feature quantity series derived in said stored signal feature quantity calculation section, by sequentially setting a predetermined observation window with respect to each section of a size which corresponds to said observation window, and calculating a histogram of feature quantities within said observation window;
   a stored signal histogram grouping section which groups histogram series sets in a histogram series obtained from said stored signal histogram series calculation section, for which a mutual similarity level calculated with a predetermined L1 distance measure satisfies a predetermined criteria;
   a stored signal histogram group selection section which determines the existence of a possibility of the inclusion of an area which should be output from within a histogram group obtained in said stored signal histogram grouping section, and selects the group which has a possibility;
   a stored signal collation section which performs collation with respect to histograms belonging to a histogram group selected in said stored signal histogram group selection section, by said predetermined L1 distance measure, and obtains a similarity value; and
   a collation result output section which determines whether or not the collated area is to be made a detection result, by the similarity value obtained in said stored signal collation section, and outputs the collated area in a case where it has been determined it is to be made a detection result.

2. A signal detection system according to claim 1, wherein said stored signal histogram grouping section performs histogram grouping based on a threshold value of the L1 distance measure.

3. A signal detection system according to claim 1, wherein there is provided a stored signal histogram thinning section for thinning the histogram in the histogram series obtained in said stored signal histogram series calculation section.

4. A signal detection system according to claim 1, wherein said stored signal histogram grouping section comprises either one of:
   a stored signal histogram local grouping section which groups histogram sets in a histogram which are continuous in said histogram series, for which a mutual similarity level satisfies a predetermined criteria, and
   a stored signal histogram global grouping section which groups histogram sets in all histograms in said histogram series, for which a mutual similarity level satisfies a predetermined criteria.

5. A signal detection system according to claim 1, wherein said stored signal histogram grouping section comprises:
   a stored signal histogram local grouping section which groups histogram sets in a histogram which are continuous in said histogram series, for which a mutual similarity level satisfies a predetermined criteria, and
   a stored signal histogram global grouping section which groups histogram sets in all histograms in said histogram series, for which a mutual similarity level satisfies a predetermined criteria.

6. A signal detection method for detecting signals similar to a target signal from stored signals which are stored, comprising:
   a target signal feature quantity calculation step for deriving a feature quantity series from a target signal;
   a stored signal feature quantity calculation step for deriving a feature quantity series from a stored signal;
   a target signal histogram calculation step for setting a predetermined observation window in a feature quantity series derived in said target signal feature quantity calculation step, and calculating a histogram of the feature quantities within said observation window;
   a stored signal histogram series calculation step for obtaining a histogram series in regard to a feature quantity series derived in said stored signal feature quantity calculation step, by sequentially setting a predetermined observation window with respect to each section of a size which corresponds to said observation window, and calculating a histogram of feature quantities within said observation window;
   a stored signal histogram grouping step for grouping histogram series sets in a histogram series obtained from said stored signal histogram series calculation step, for which a mutual similarity level calculated with a predetermined L1 distance measure satisfies a predetermined criteria;

a stored signal histogram group selection step for determining the existence of a possibility of the inclusion of an area which should be output from within a histogram group obtained in said stored signal histogram grouping step, and selecting the group which has a possibility;

a stored signal collation step for performing collation with respect to histograms belonging to a histogram group selected in said stored signal histogram group selection step, by said predetermined L1 distance measure, and obtaining a similarity value; and a collation result output step for determining whether or not the collated area is to be made a detection result, by the similarity value obtained in said stored signal collation step, and outputting the collated area in a case where it has been determined it is to be made a detection result.

7. A signal detection method according to claim 6, wherein said stored signal histogram grouping step performs histogram grouping based on an upper threshold value of the L1 distance measure.

8. A signal detection method according to claim 6, wherein there is provided a stored signal histogram thinning step for thinning the histogram from the histogram series obtained in said stored signal histogram series calculation step.

9. A program on a computer-readable medium for executing processing for detecting signals similar to a target signal from stored signals which are stored, for executing on a computer, comprising:

a target signal feature quantity calculation process for deriving a feature quantity series from a target signal;

a stored signal feature quantity calculation process for deriving a feature quantity series from a stored signal;

a target signal histogram calculation process for setting a predetermined observation window in a feature quantity series derived in said target signal feature quantity calculation process, and calculating a histogram of the feature quantities within said observation window;

a stored signal histogram series calculation process for obtaining a histogram series in regard to a feature quantity series derived in said stored signal feature quantity calculation process, by sequentially setting a predetermined observation window with respect to each section of a size which corresponds to said observation window, and calculating a histogram of feature quantities within said observation window;

a stored signal histogram grouping process for grouping histogram series sets in a histogram series obtained from said stored signal histogram series calculation process, for which a mutual similarity level calculated with a predetermined L1 distance measure satisfies a predetermined criteria;

a stored signal histogram group selection process for determining the existence of a possibility of the inclusion of an area which should be output from within a histogram group obtained in said stored signal histogram grouping process, and selecting the group which has a possibility;

a stored signal collation process for performing collation with respect to histograms belonging to a histogram group selected in said stored signal histogram group selection process, by said predetermined L1 distance measure, and obtaining a similarity value; and a collation result output process for determining whether or not the collated area is to be made a detection result, by the similarity value obtained in said stored signal collation process, and outputting the collated area in a case where it has been determined it is to be made a detection result.

\* \* \* \* \*